(12) United States Patent
Wilkes et al.

(10) Patent No.: US 10,584,756 B2
(45) Date of Patent: Mar. 10, 2020

(54) ULTRASONIC BRAKE WEAR SENSORS

(71) Applicant: Meggitt Aerospace Limited, Dorset (GB)

(72) Inventors: John Wilkes, Cambridgeshire (GB); David Bateman, London (GB)

(73) Assignee: Meggitt Aerospace Limited, Dorset (GB)

( * ) Notice: Subject to any disclaimer, the term of this patent is extended or adjusted under 35 U.S.C. 154(b) by 1 day.

(21) Appl. No.: 16/080,406

(22) PCT Filed: Feb. 23, 2017

(86) PCT No.: PCT/GB2017/050470
§ 371 (c)(1),
(2) Date: Aug. 28, 2018

(87) PCT Pub. No.: WO2017/149276
PCT Pub. Date: Sep. 8, 2017

(65) Prior Publication Data
US 2019/0056008 A1    Feb. 21, 2019

(30) Foreign Application Priority Data

Feb. 29, 2016  (GB) .................................. 1603444.9

(51) Int. Cl.
*B60T 17/22*    (2006.01)
*F16D 66/02*    (2006.01)

(52) U.S. Cl.
CPC ............ *F16D 66/028* (2013.01); *B60T 17/22* (2013.01); *B60T 17/221* (2013.01);
(Continued)

(58) Field of Classification Search
CPC ..... F16D 66/027; F16D 66/028; B60T 17/221
(Continued)

(56) References Cited

U.S. PATENT DOCUMENTS 8,405,386 B2 * 3/2013 Erickson ............... B60T 17/221
                                                    324/207.2
2012/0027585 A1 * 2/2012 Daniels ................. F16D 66/025
                                                    416/1
2015/0354652 A1 * 12/2015 Wong .................... B60T 17/221
                                                    73/129

FOREIGN PATENT DOCUMENTS

DE         102013222228    4/2015
EP              2708771    3/2014
WO         WO 03/078857    9/2003

* cited by examiner

*Primary Examiner* — Christopher P Schwartz
(74) *Attorney, Agent, or Firm* — Renner Kenner Greive Bobak Taylor & Weber

(57) ABSTRACT

Brake wear sensors for the brake disc stacks commonly used in aircraft brake systems are disclosed. An ultrasonic transducer is employed to transmit signals to a reflective surface and to receive the reflected signals in return. The time that elapses between the transmission of the ultrasonic signal and the reception of its reflection correlates with the separation between the transducer and the reflective surface. The reflective surface is operatively connected to a pressure plate of the associated brake disc stack such that, as the stack wears, the reflective surface is displaced along with the pressure plate. That displacement correlates with brake wear. In one embodiment, the ultrasonic brake wear detector is an independent unit mounted to the brake housing, while another embodiment includes the detector as an integral portion of a brake actuator connected to such housing. A third embodiment for use with brake disc stacks exhibiting substantial wear before requiring service employs either twin cylinders, one with a piston and the other a wear pin, or a single cylinder housing a wear pin operatively fixed to the brake disc stack.

19 Claims, 6 Drawing Sheets

(52) U.S. Cl.
CPC ......... *F16D 66/023* (2013.01); *F16D 66/026* (2013.01); *F16D 66/027* (2013.01)

(58) Field of Classification Search
USPC ..... 188/1.11 E, 1.11 L, 1.11 R; 73/129, 130; 116/208; 340/454
See application file for complete search history.

ULTRASONIC BRAKE WEAR SENSORS

CROSS-REFERENCE TO RELATED APPLICATION

This application claims priority to pending provisional application GB 1603444.9 filed 29 Feb. 2016.

TECHNICAL FIELD

The invention herein resides in the art of brake wear sensors. More particularly, the invention relates to such sensors for use in association with disc brake assemblies. Specifically, the invention provides brake wear sensors operative in association with aircraft disc or heat stacks to monitor the wear of the stack as it is used in effecting aircraft stops. The brake wear sensors employ ultrasonic transmission, reflection and reception to monitor the wear.

BACKGROUND OF THE INVENTION

Aircraft commonly use a stack of alternatingly interleaved brake discs for braking the aircraft. As the brake disc stack is used, the discs wear and the aggregate of that wear reduces the thickness of the stack. As a result, the thermal capacity and structural integrity of the brake disc stack changes.

When the stack reaches a predetermined threshold, there is a need to service the stack by replacing the rotors and stators thereby returning the stack to its original thickness. Various approaches have been employed in the past for monitoring when this refurbishing must take place. The most basic type of monitoring includes periodic visual inspection of the brake disc stack itself. Other techniques have relied upon the observation of a wear pin, which is in operative communication with the stack itself. Other techniques have employed a proximity detector or a linear variable differential transformer or the like providing an output signal corresponding to the remaining thickness of the stack.

In the past, the techniques used for monitoring brake wear in aircraft brake disc stacks have been time consuming, somewhat inaccurate, given to problems with the environment and ambient conditions within which they operate, and intrusive into the brake assembly system itself.

SUMMARY OF THE INVENTION

In light of the foregoing, it is a first aspect of the invention to provide brake wear sensors that are accurate in use.

Another aspect of the invention is to provide brake wear sensors that are readily implemented with existing heat stacks or brake stacks of commercial aircraft.

Yet a further aspect of the invention is the provision of brake wear sensors that are sealed from the environment and harmful ambient conditions.

Still a further aspect of the invention is the provision of brake wear sensors that employ and rely upon ultrasonic transducers to emit and receive reflected ultrasonic waves to determine the thickness of the stack at any point in time. Indeed, it is an aspect of the invention to provide ultrasonic brake wear sensors in which the ultrasonic waves are maintained within a sealed cavity filled with hydraulic brake fluid, ensuring the integrity of sensor operation.

The foregoing and other aspects of the invention that will become apparent as the detailed description proceeds are achieved by an ultrasonic brake wear sensor, comprising a housing; an elongated member received by said housing and having a first end thereof extending from said housing and engaging a brake disc stack, and a second end thereof maintained within said housing; an ultrasonic transducer received by said housing and in operative communication with said first end of said elongated member; and wherein a cavity is maintained between said housing and said first end of said elongated member, said cavity being filled with a liquid fluid.

Other aspects of the invention are achieved by the foregoing structure wherein the elongated member comprises a piston, and the second end comprises a piston head.

Other aspects of the invention are achieved by the foregoing structure wherein the first end of the piston comprises a foot.

Still other aspects of the invention are achieved by the foregoing structure wherein the liquid fluid comprises hydraulic brake fluid.

BRIEF DESCRIPTION OF THE DRAWINGS

For a complete understanding of the various aspects of the invention, reference should be made to the following detailed description and accompanying drawings wherein.

BEST MODE AND PREFERRED EMBODIMENT OF THE INVENTION

Figure 1:
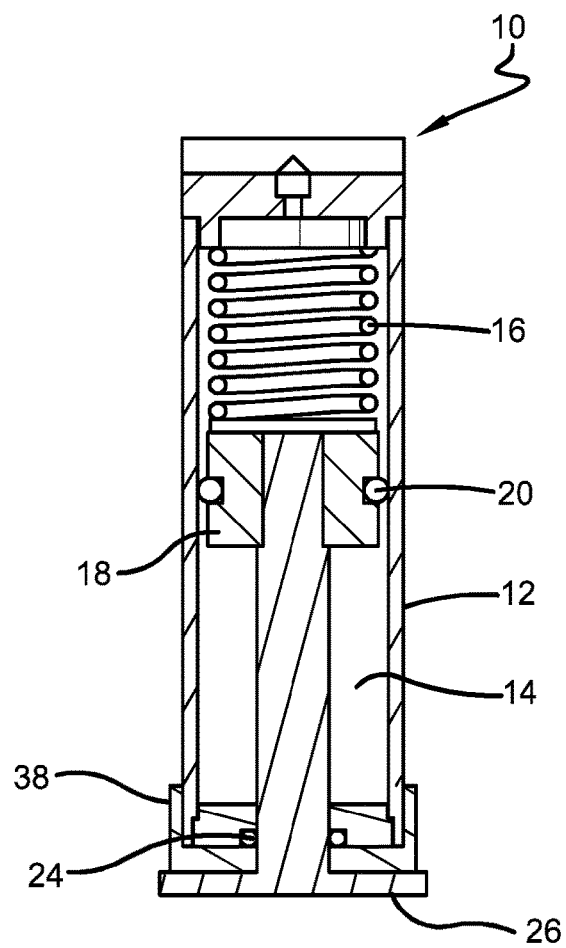
FIG. 1 is a cross-sectional view of a first embodiment of the invention showing no wear of the disc stack.
Figure 2:
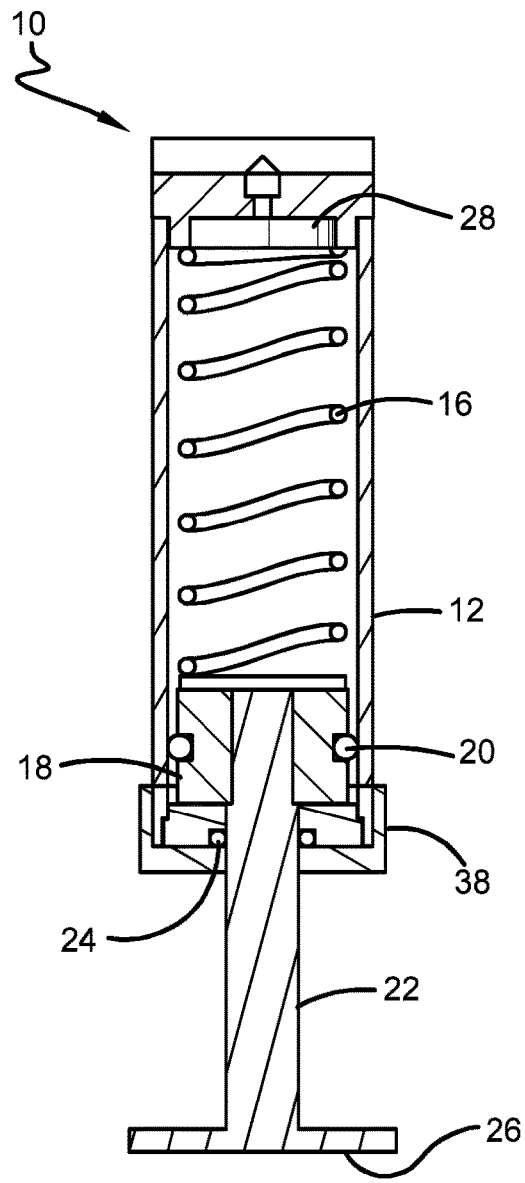
FIG. 2 is a cross-sectional view of the sensor of FIG. 1 when the disc stack is in the condition of full wear.

Referring now to the drawings and more particularly FIGS. 1 and 2, it can be seen that an ultrasonic brake wear detector according to a first embodiment of the invention is designated generally by the numeral 10. The embodiment 10 is that of a self-contained unit, with the showing in FIG. 1 being of the ultrasonic brake wear detector being provided in association with a new brake assembly where no wear has been experienced, and that of FIG. 2 is a fully worn situation.

The ultrasonic brake wear detector 10 includes a cylindrical housing 12 defining a cavity 14. The cavity 14 is filled with an appropriate fluid such as hydraulic brake fluid, silicone oil, or the like. Also maintained within the cavity 14 is a biasing spring 16 urging against a piston head 18, which is operative to move within the cavity 14. One or more O-rings 20 is provided about the outer circumference of the piston head 18 and in contacting engagement with the inner wall of cylindrical housing 12 to serve as a sliding bearing. Extending centrally from the piston head 18 is a piston rod 22, in the nature of a pin or other appropriate stem. An O-ring seal 24 accommodates movement of the stem or rod 22 out of the cavity 14 while ensuring that hydraulic fluid does not leak or escape. At the end of the piston rod or stem 22 is a contact foot 26, intended for contacting engagement with the pressure plate of the brake assembly.

Figure 3:
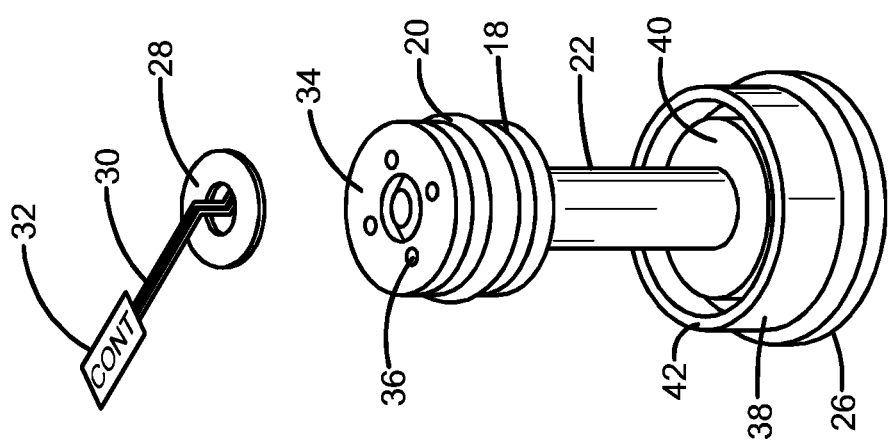
FIG. 3 is a perspective view of the piston employed in the embodiment of FIGS. 1 and 2.

With reference to FIG. 3 and continued reference to FIGS. 1 and 2, it can be seen that an ultrasonic transducer 28 is positioned and maintained at the sealed top of the cylinder 12. Lead wires 30 extend from the ultrasonic transducer 28 to a controller 32 operative to control the transducer 28 to send and receive reflected signals. In that regard, the top surface 34 of the piston head 18 is a target for the ultrasonic transducer 28, which, under control of the controller 32, emits ultrasonic signals that are reflected off of the surface 34 and received via the transducer 28, the delay between the emission and reception of the ultrasonic signals correlating with the distance between the surface 34 and the transducer 28. As will be apparent, this distance correlates with the brake wear experienced by the associated brake disc stack. It will be appreciated that the ultrasonic transducer 28 will necessarily be tuned or adjusted to accommodate the hydraulic brake fluid or silicone oil used.

With reference to FIG. 3, it can be seen that the piston head 18 is characterized by a plurality of axial bores or passages 36 that allow for the hydraulic fluid within the chamber 14 to be present both above and below the head 18 as the head moves within the chamber 14. Accordingly, the ultrasonic wave emitted and received by the transducer 28 passes through the hydraulic brake fluid or silicone oil, which is found to be a good transmitter for such signals. Also shown in FIG. 3 is the can or cup 38 having an appropriate elastomeric or other suitable material therein defining the end of the cylindrical housing 12 and through which the piston rod or stem 22 passes. An appropriate elastomeric seal 42 may be provided in association with the cup 38 to seal with the cylindrical housing 12.

Figure 4:
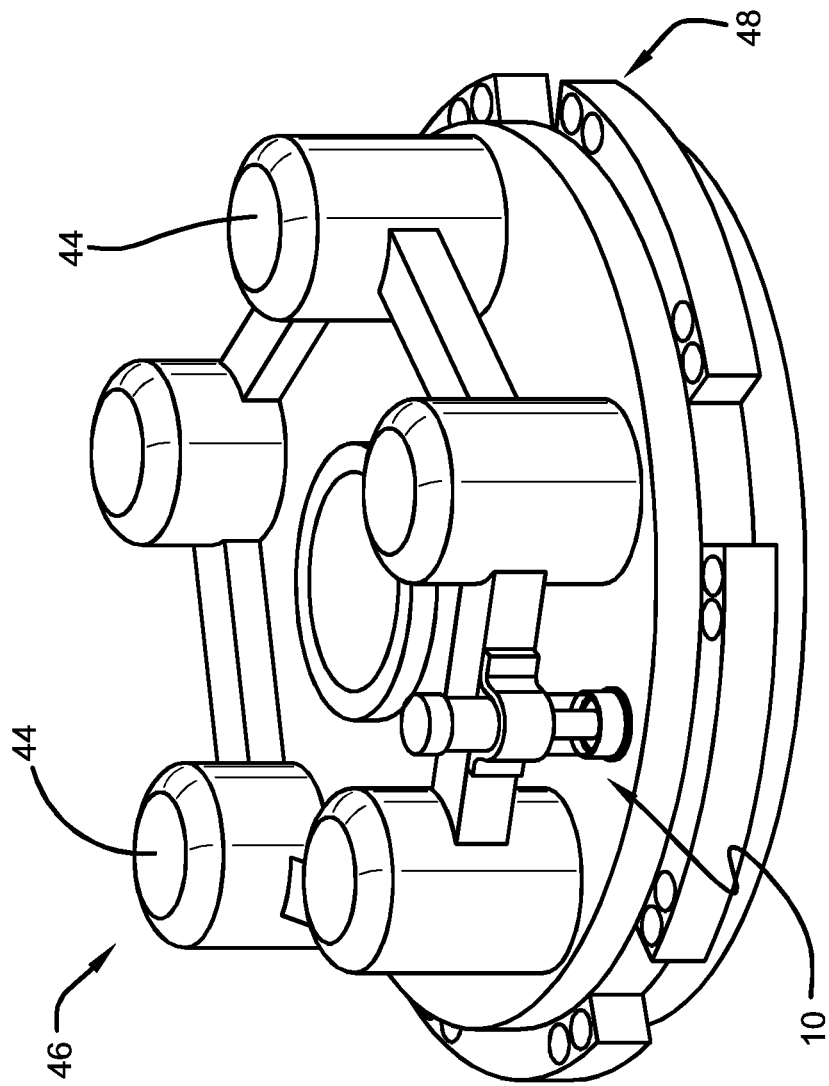
FIG. 4 is a perspective view of a brake assembly employing the first embodiment of the invention showing the ultrasonic wear sensor mounted to the brake assembly housing and in association with the brake pistons.

With reference now to FIG. 4, it can be seen that the ultrasonic brake wear detector 10 is received, along with a plurality of standard brake actuators 44, by a typical brake housing 46. The foot 26 of the ultrasonic brake wear detector 10 is in contacting engagement with the pressure plate or other suitable portion of the brake stack, as are the pistons of the hydraulic brake cylinders 44. These are all shown illustratively as being in association with a heat stack 48 comprising a pressure plate, alternatingly interleaved stators and rotors, and an endplate, all of which are well known and understood by those skilled in the art.

In operation, the foot 26 is in contacting engagement with the pressure plate or other appropriate portion of the heat stack 48, being urged thereagainst by means of the bias spring 16. As the brake or heat stack wears, the piston assembly comprised of the head 18, rod 22 and foot 26, are displaced a distance consistent with such wear. Accordingly, the distance between the ultrasonic transducer 28 and the surface 34 of the piston head 18 also extends, this distance being readily determined by the emission of signals by the ultrasonic transducer 28 passing through the brake fluid, being reflected off of the top surface 34 of the displaced piston head, and being received again by the transducer 28. The controller 32, or other appropriate device, can correlate the timing of the reflection with the distance of separation between the transducer 28 and surface 34. That distance correlates with brake wear and can be read through the controller 32 and/or by use of a hand-held reader of radiofrequency (RF) signals or the like. When that distance reaches a threshold level, it is an indication that the brake is fully worn, or worn to a degree that it requires attention or service.

Figure 6:
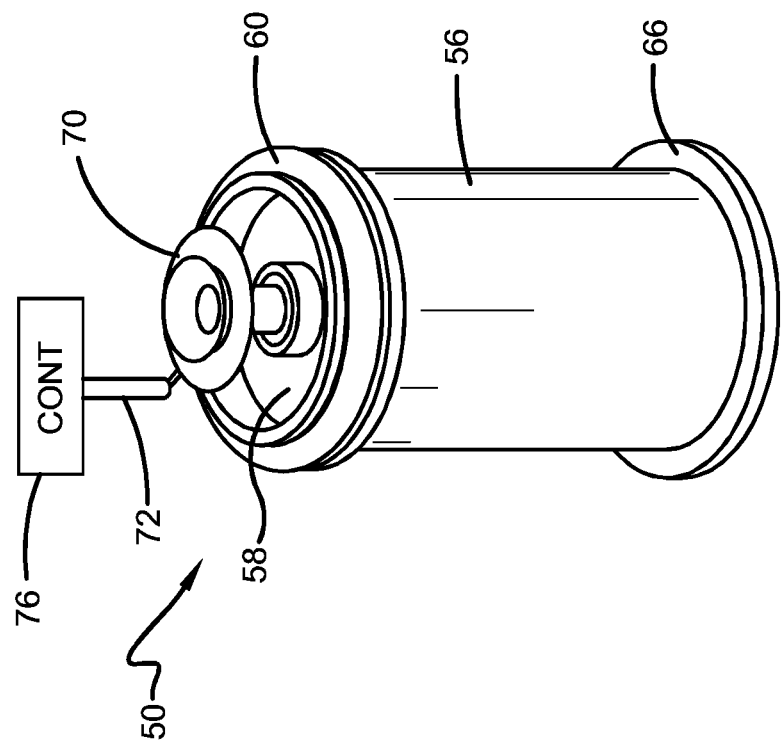
FIG. 6 is a perspective view of the piston shown in association with the ultrasonic transducer in accordance with a second embodiment of the invention.
Figure 5:
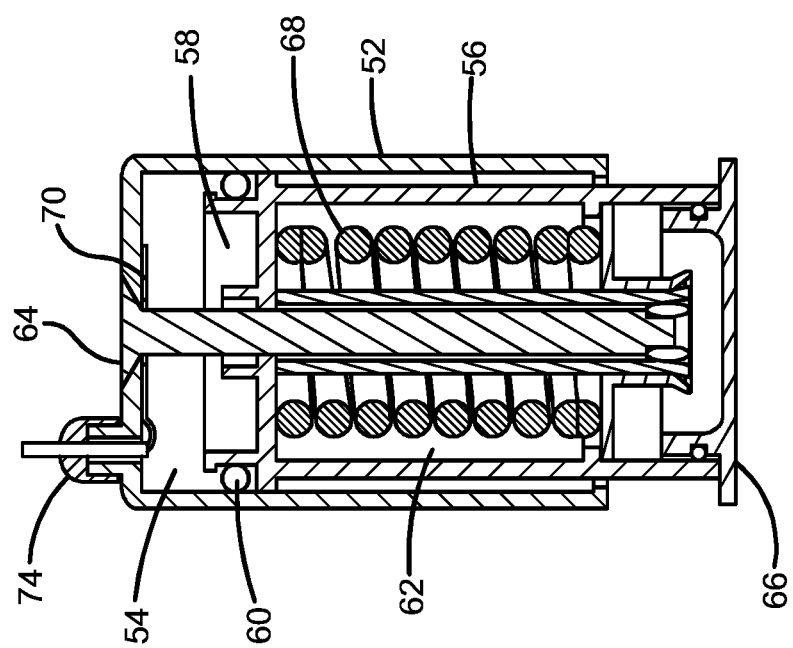
FIG. 5 is a cross-sectional view of a second embodiment of an ultrasonic brake wear sensor according to the invention.
Figure 7:
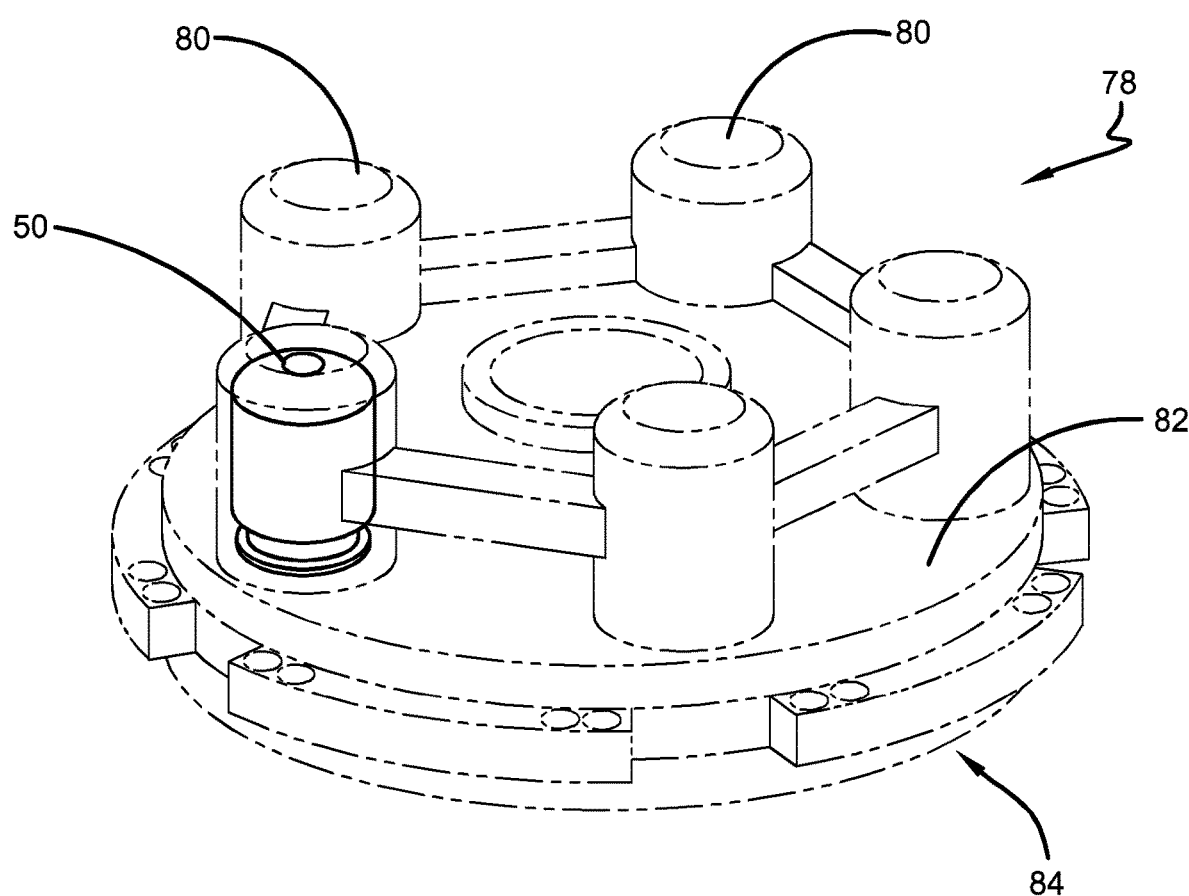
FIG. 7 is a perspective view of the brake housing of the invention showing the positioning of the brake actuators, one of which contains the ultrasonic transducer employed with the invention.

With reference now to FIGS. 5, 6, and 7, it can be seen that another embodiment of an ultrasonic brake wear detector is designated generally by the numeral 50. While the embodiment discussed above was an independent detector, the unit 50 of this second embodiment is integral with one of the brake actuators of the brake system. As shown, the combination of brake actuator and ultrasonic brake wear detector includes a housing 52 defining an interior cylindrical chamber, the upper portion 54 being adapted to receive hydraulic brake fluid or silicone oil therein. Pressurized hydraulic brake fluid in the chamber 54 urges against a piston head 58 of piston 56 received within the housing 52. The piston head 58 is sealed against the interior cylindrical walls of the housing 52 by an appropriate seal, such as an O-ring 60.

A swage tube 62 is connected to and extends axially from a top 64 of the cylindrical housing 52. Those skilled in the art will readily appreciate that the swage tube 62 serves as a means for maintaining the built-in clearance of the brake disc stack. The swage tube 62 passes through the piston head 58 with an interference fit or swage lock, such that as the piston head 58 is pushed downwardly by hydraulic pressure toward the open ends of the cylindrical housing 52, the piston head 58 advances its locking engagement with the swage tube 62 to accommodate brake wear and assure a constant built-in clearance in the brake stack. This type of device is well known in the art.

A piston foot 66 is attached at the bottom to the piston 56 and is adapted for contacting engagement with a pressure plate of the associated brake disc stack, all in standard fashion. A biasing spring 68, also well known and implemented in the art, serves as a return spring after each brake actuation.

Of particular novelty is the inclusion of an ultrasonic transducer 70 maintained at the top 64 of the housing 52. Wiring 72 extends from the ultrasonic transducer 70 and through a sealing gland 74. As presented above, the ultrasonic transducer is controlled by an appropriate controller 76. As discussed above, under control of the controller 76, the ultrasonic transducer 70 may be caused to emit ultrasonic signals to and off of the top of the piston head 58. As the locking position of the piston head 58 changes as it moves along the swage 62 as the brake wears, the time between the emission of the ultrasonic signals and the reception of the same off of the piston head 58 similarly changes. The time between emission and reception of the reflection correlates with the position of the foot 66 on the pressure plate of the brake disc stack. That position correlates with brake wear and the thickness of the stack and is contemplated as being read through the controller 76 and/or by use of a hand-held reader of RF signals or the like.

In FIG. 7, a brake assembly 78 is shown employing the ultrasonic brake wear detector integrated with a brake actuator 50. Also included are a plurality of brake actuators 80, similar in nature to the unit 50, but absent the ultrasonic transducer and associated elements. The brake actuators and brake wear sensor 50, 70 are appropriately connected to the housing 82 and in communication with an associated heat stack designated illustratively as 84, the same including a pressure plate, endplate, and associated and interleaved stators and rotors therebetween. With the foot 66 in operative engagement with the pressure plate of the brake disc stack, the time of transmission, reflection, and reception of the ultrasonic signals from the transducer 70 to the piston head 58 correlate directly with brake wear and the need for service or refurbishing.

Figure 8:
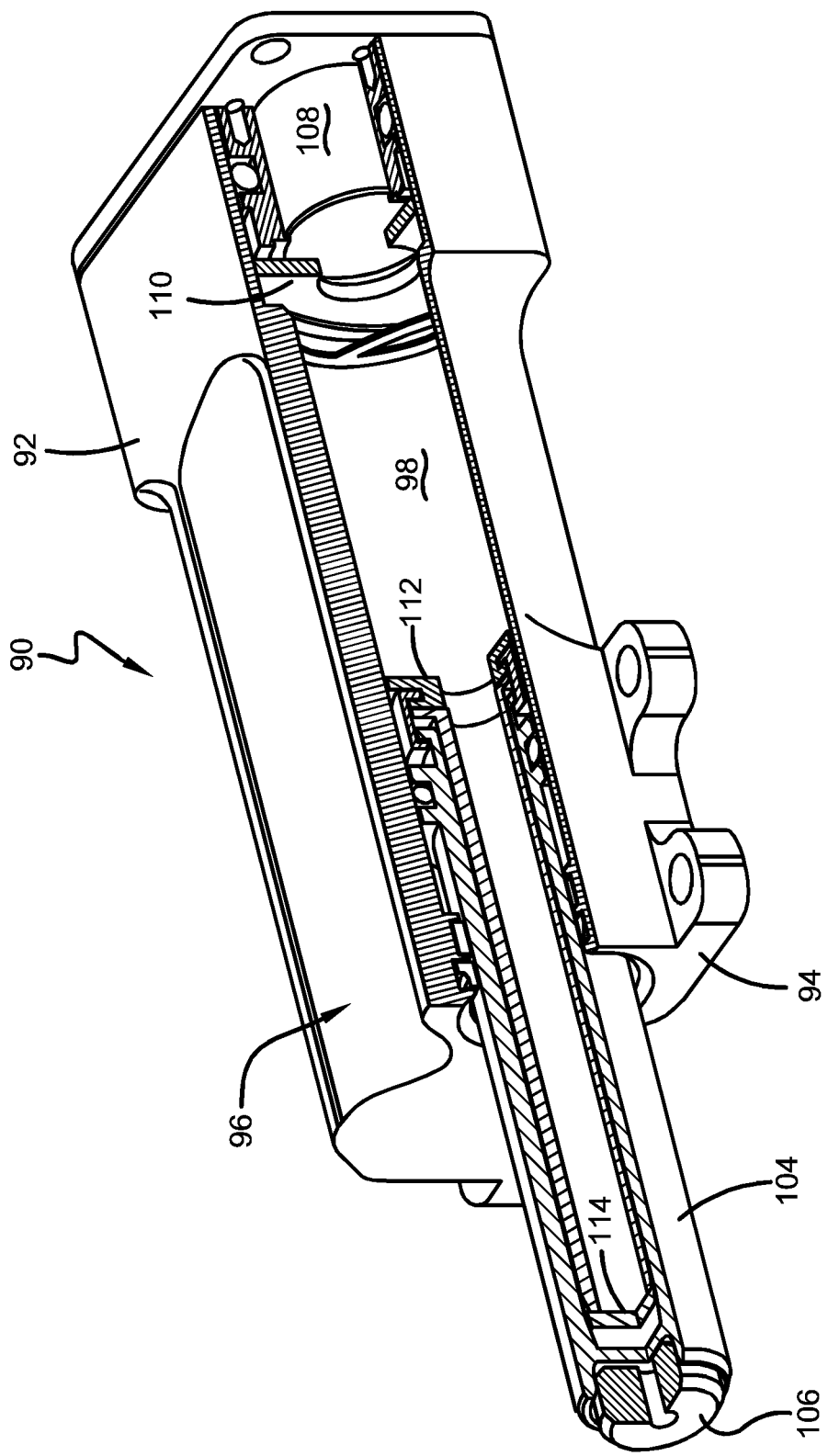
FIG. 8 is a partial sectional view of a third embodiment of the invention employing parallel cylinders to accommodate substantial wear of the disc stack.
Figure 9:
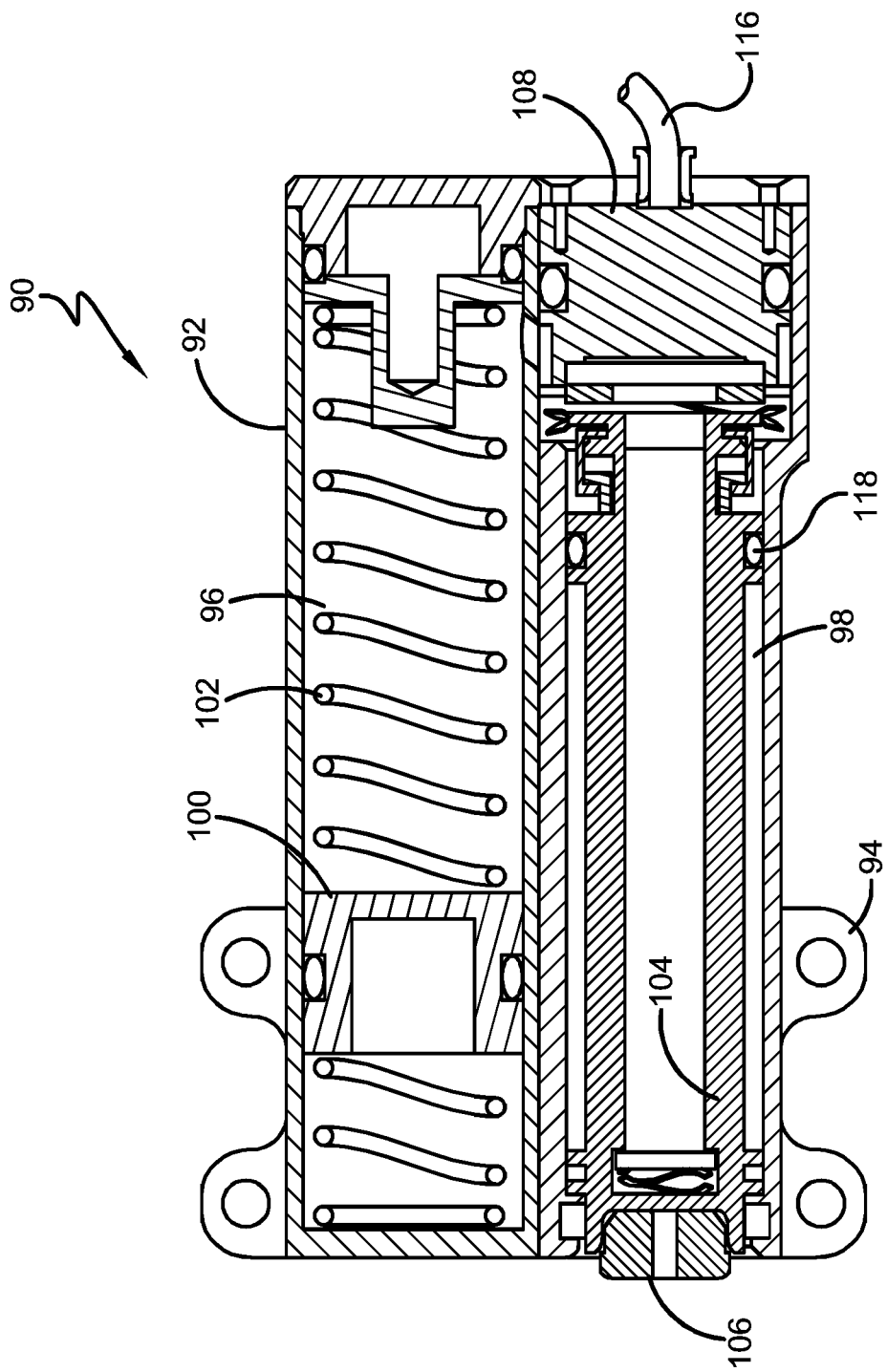
FIG. 9 is a sectional view of the third embodiment of FIG. 8 in an unextended state.

With reference now to FIGS. 8 and 9, an appreciation can be obtained of a third embodiment of the invention, designated generally by the numeral 90. This embodiment is directed to a compact design for implementation with brake stacks accommodating significant wear. The brake wear detector 90 has a dual cylinder housing 92 mounted as by a mounting plate 94 to an appropriate brake housing. A pair of parallel cylinders 96, 98, preferably immediately adjacent each other, are provided in hydraulic communication with each other by means of a passageway interconnecting the two near the tops thereof. A piston head 100 is received within the cylinder 96 in biased engagement with an embedded spring 102. A wear pin piston 104 is received within the adjacent cylinder 98, the wear pin 104 having a foot 106 of appropriate insulating material for either contacting or fixed engagement with a pressure plate or pressure stator of an associated brake disc stack. An ultrasonic transducer 108 is mounted atop the cylinder 98 to reflect ultrasonic signals off various targets.

A first static target 110 is fixed to the housing 92 and within the cylinder 98, as shown. A near-target 112 is atop the annular surface of the wear pin 104, which is the closest surface of the wear pin to the ultrasonic transducer 108. The third target is the far target 114, which is positioned at the end of the wear pin 104, furthest from the transducer 108. Those skilled in the art will appreciate that the static and near targets 110, 112 may be used to measure known displacements in order to calibrate and/or remove any instrumental delays or anomalies in the unit 90. The far target 114 is a target off of which reflected ultrasonic signals will be timed to determine the displacement of the wear pin 104, and thus determine the need for brake wear servicing.

A signal conduit 116 interconnects the ultrasonic transducer 108 with an appropriate controller, such as the controller 32 shown in FIG. 3.

As will be further appreciated by those skilled in the art, various O-ring seals, wiper seals, and the like are necessarily employed between the piston head 100 and the walls of the cylinder 96, as well as between the wear pin 104 and the walls of the cylinder 98.

In use, a hydraulic brake fluid or silicone oil fills the cylinder 96 above the piston head 100, the cylinders 96 and 98 being in fluid communication with each other as mentioned above. The spring 102 urges the piston head 100 upward, as shown in the drawing, driving the fluid from the cylinder 96 into the adjacent cylinder 98 and against the head of the wear pin 104. This force ensures that the wear pin 104 is maintained in contact with the pressure plate or pressure stator of the brake disc stack at all times. As the pressure plate extends during operation and/or wear, the urging of the biasing spring 102 against the piston head 100 ensures that the foot 106 of the wear pin 104 is in constant contacting engagement with the pressure plate such that the monitoring of the position of the target 114 in communication with the ultrasonic transducer 108 produces emitted, reflected and received ultrasonic signals indicative of the position of the target 114 and, accordingly, the associated pressure plate. All of this correlates with the wear of the brake disc stack. At the end of the braking operation, the pressure plate urges the wear pin 104 back slightly into the cylinder 98 to reestablish the running or built-in clearance among the discs. This causes the head of the wear pin 104 to drive a small volume of hydraulic brake fluid or silicone oil back into the cavity 96 and against the piston head 100, against the biasing of the embedded spring 102.

It is further contemplated as a portion of the instant invention that a single cavity system might be employed by fixedly attaching the foot 106 of the wear pin 104 to the pressure plate or pressure stator ensuring constant contacting engagement between the two. The need for piston 100 and biasing spring 102 is thereby obviated, and the implementation of an ultrasonic brake wear monitor embodying a single cylinder may be achieved. That cylinder may be filled with hydraulic fluid or silicone oil, if found desirable, to protect the environment of operation of the ultrasonic transducer and/or to enhance the transmission of ultrasonic signals. If such a filling is not required, the cylinder may be void.

Thus it can be seen that the various aspects of the invention have been satisfied by the structure presented above. The true scope of the invention will be defined by claims, representative ones of which follow.

What is claimed is:

1. An ultrasonic brake wear detector, comprising:
   a housing;
   an elongated member received by said housing and having a first end thereof extending from said housing and engaging a brake disc stack, and a second end thereof maintained within said housing;
   an ultrasonic transducer received by said housing and in operative communication with said first end of said elongated member; and
   wherein a cavity is maintained between said housing and said first end of said elongated member, said cavity being filled with a liquid fluid.

2. The ultrasonic brake wear detector according to claim 1, wherein said elongated member comprises a piston and said second end comprises a piston head.

3. The ultrasonic brake wear detector according to claim 1, wherein said first end of said piston comprises a foot.

4. The ultrasonic brake wear detector according to claim 3, wherein said liquid fluid is taken from the group of hydraulic brake fluid and silicone oil.

5. The ultrasonic brake wear detector according to claim 4, wherein said piston head comprises a first ultrasonic reflective target in operative communication with said ultrasonic transducer.

6. The ultrasonic brake wear detector according to claim 5, wherein said housing is attached to a brake housing of a brake disc stack.

7. The ultrasonic brake wear detector according to claim 5, wherein said housing is integrated with a brake actuator connected to a brake housing of a brake disc stack.

8. The ultrasonic brake wear detector according to claim 5, wherein said elongated member is received by a first cylinder in said housing.

9. The ultrasonic brake wear detector according to claim 8, wherein said elongated member is spring-biased into contacting engagement of said foot with a pressure plate of a brake disc stack.

10. The ultrasonic brake wear detector according to claim 9, wherein the wear of an associated brake disc stack is determined by a period of time between an emission of an ultrasonic signal and receipt of its reflected signal.

11. The ultrasonic brake wear detector according to claim 10, wherein an ultrasonic transducer emits said ultrasonic signal and receives said reflected signal.

12. The ultrasonic brake wear detector according to claim 11, wherein said reflected signal is reflected off of said ultrasonic reflective target.

13. The ultrasonic brake wear detector according to claim 12, wherein one of said first ultrasonic reflective target and ultrasonic transducer is fixed and the other moves with said elongated member.

14. The ultrasonic brake wear detector according to claim 13, wherein said first ultrasonic reflective target is mounted to and movable with said elongated member.

15. The ultrasonic brake wear detector according to claim 14, further comprising a second ultrasonic reflective target fixed in said first cylinder and a third reflective target fixed to an end of said elongated member opposite an end receiving said first ultrasonic reflective target, said second and third ultrasonic reflective targets providing means for calibrating said ultrasonic transducer.

16. The ultrasonic brake wear detector according to claim 15, further comprising a second cylinder in hydraulic communication with said first cylinder.

17. The ultrasonic brake wear detector according to claim 16, wherein said second cylinder receives a spring-biased piston head hydraulically driving said piston in said second cylinder.

18. The ultrasonic brake wear detector according to claim 17, wherein said first and second cylinders are parallel with each other.

19. The ultrasonic brake wear detector according to claim 15, wherein said foot is fixedly attached to pressure plate of a brake disc stack.

\* \* \* \* \*